United States Patent Office
2,995,557
Patented Aug. 8, 1961

2,995,557
PRODUCTION OF ACETOPHENONE
DERIVATIVES
Arnold Brossi, Riehen, and Otto Schnider, Basel, Switzerland, assignors to Hoffmann-La Roche Inc., Nutley, N.J., a corporation of New Jersey
No Drawing. Filed Feb. 5, 1959, Ser. No. 791,252
Claims priority, application Switzerland Feb. 14, 1958
12 Claims. (Cl. 260—289)

This invention pertains to acetophenone derivatives and to a method for preparing them. More particularly, the invention relates to 2-β-acylamidoalkyl-acetophenones of the following structural formula

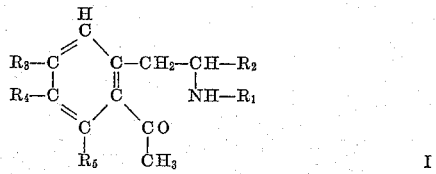

I wherein $R_1$ represents acyl, $R_2$ represents hydrogen or lower alkyl, and $R_3$, $R_4$ and $R_5$ each represents hydrogen, lower alkyl or lower alkoxy, or two adjacent groups, e.g. $R_3$ and $R_4$ or $R_4$ and $R_5$, together form an alkylenedioxy group.

Compounds of the above description may be produced by acylating a 1-methyl-3,4-dihydroisoquinoline represented by the structural formula

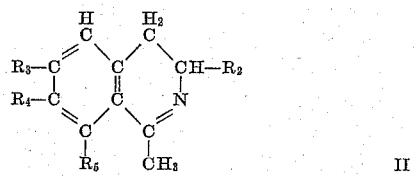

II to obtain a compound of the formula

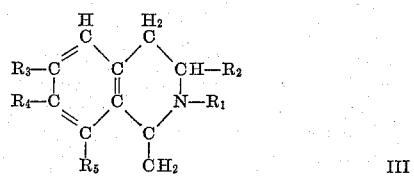

III and then treating the latter with dilute mineral acid to open the nitrogen-containing ring. The symbols R in Formulas II and III refer to the same substituents as in Formula I.

The 1-methyl-3,4-dihydroisoquinoline may be most efficaciously acylated with an acid anhydride, e.g. an aliphatic acid anhydride such as acetic anhydride, propionic anhydride, butyric anhydride, etc., aromatic acid anhydrides, such as benzoic anhydride, substituted benzoic anhydride, cyclic anhydrides of polyacids, such as phthalic anhydride, substituted phthalic anhydride, and the like. Preferably the acylation is effected in the presence of a warm, inert, anhydrous solvent such as pyridine. A shift of the double bond as well as acylation occurs and a 1-methylene - 2 - acyl - 1,2,3,4 - tetrahydroisoquinoline results. The heterocyclic ring of the 1-methylene-2-acyl-1,2,3,4-tetrahydroisoquinoline may then be opened by treatment with a dilute mineral acid, e.g. hydrochloric acid, hydrobromic acid, sulfuric acid, phosphoric acid, nitric acid and the like. By dilute mineral acid is meant an acid of the type described up to about 6 normal, preferably about 3 normal.

Both in the discussion above and hereinafter, the term "lower alkoxy" refers to aliphatic ether groups such as methoxy, ethoxy, propoxy, isopropoxy, butoxy, isobutoxy, amyloxy and the like. "Alkyl" refers to radicals of the aliphatic series, preferably lower alkyl groups such as methyl, ethyl, propyl, isopropyl, butyl, isobutyl, amyl, etc. The term "acyl," as evident from the foregoing discussion of the process refers to acyl radicals of mono- and di-carboxylic acids or their anhydrides of the aliphatic, araliphatic and aromatic series, including such groups as acetyl, propionyl, butyryl, benzoyl, phthaloyl, etc. The alkylenedioxy (polymethylenedioxy) groups formed when two adjacent radicals represented by $R_3$, $R_4$ or $R_5$ are joined include preferably lower alkylenedioxy groups such as methylenedioxy, ethylenedioxy. The terminal oxygens of the alkylenedioxy groups are attached to adjacent carbon atoms of the ring.

The starting materials represented by Formula II may be produced as described in Elderfield, Heterocyclic Compounds, vol. IV (Wiley, New York, 1952), pages 347 to 353. Some of them are known compounds; 1-methyl-6,7-dimethoxy-3,4-dihydroisoquinoline is described by A. Kaufmann and R. Radosenic in Berichte der dtsch. chem. Ges., vol. 49 (1916), page 638; 1,3-dimethyl-6,7-dimethoxy-3,4-dihydroisoquinoline is described by M. Losa-Tamayo and R. Madroñero in Festschrift A. Stoll, Basel, 1957, pages 220–226.

The compounds of this invention are useful in the preparation of corydaldine and other compounds having generally analogous structure, e.g. compounds of the type represented by the formulas

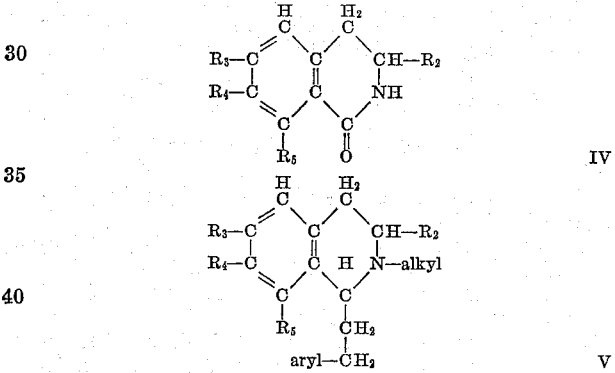

IV

V $R_2$, $R_3$, $R_4$ and $R_5$ in Formulas IV and V representing the same groups as in Formula I.

The compounds of Formula IV are produced from the compounds of Formula I by treating the latter with a hypohalite, e.g. sodium hypobromite, to produce the corresponding 2-β-acyl-amidoalkyl-benzoic acid. The last named compound is cyclized and deacylated by distillation under high vacuum. The compounds of Formula V may be produced by condensing the 2-β-acylamidoalkyl-acetophenones of Formula I with a substituted or unsubstituted aromatic aldehyde compound, cyclizing the styryl ketone formed to obtain the 3,4-dihydroisoquinoline derivative, reducing the latter and alkylating the resulting arylethyl-1,2,3,4-tetrahydroisoquinoline on the nitrogen atom. The above compounds are useful as analgesics, antipyretics and/or antirheumatics.

The following examples are illustrative of the invention. All temperatures are given in degrees centigrade.

*Example 1*

54 g. of 1-methyl-6,7-dimethoxy-3,4-dihydroisoquinoline were dissolved in 270 ml. of a mixture of pyridine-acetic anhydride (1:1) and left for 3 hours on a water bath. The mixture was then evaporated to dryness under water vacuum. The residue was boiled with ethyl acetate to obtain 51 g. of 1-methylene-2-acetyl-6,7-dimethoxy-1,2,3,4-tetrahydroisoquinoline, M.P. 107–108°.

26 g. of 1-methylene-2-acetyl-6,7-dimethoxy-1,2,3,4-tetrahydroisoquinoline were dissolved in 50 ml. of 3 N hydrochloric acid while warming gently. The resulting yellow solution was cooled with ice water, then made alkaline with potassium carbonate. After filtering and drying, 26 g. of 2-β-acetamidoethyl-4,5-dimethoxy-acetophenone were obtained. The product was dissolved and purified from ethyl acetate, M.P. 124°. The U.V. spectrum in ethanol showed maxima at 231, 274 and 304 mμ (ε=24,100, 8750 and 5500).

The above compound was further converted as follows: 20 g. of 2-β-acetamidoethyl-4,5-dimethoxy-acetophenone were dissolved in 180 ml. of dioxane. A cold solution containing 18 g. of bromine in sodium hydroxide solution (48 g. sodium hydroxide in 225 ml. of water) was added dropwise with stirring. After the solution had all been added, the reaction mixture was stirred for one hour. Sodium bisulfite solution was then added whereupon excess oxidizing agent was destroyed. The dioxane and the bromoform produced in the reaction were then removed by evaporation under water vacuum. The residue was acidified with hydrochloric acid, filtered, washed with water and dried. 15 g. of 2-β-acetamidoethyl-4,5-dimethoxy-benzoic acid, M.P. 188–190°, were thus obtained. 10 g. of this compound were distilled in a Claisen flask under high vacuum over a free flame. After a forerun of acetic acid, 6.0 g. of 1-oxo-6,7-dimethoxy-1,2,3,4-tetrahydroisoquinoline were obtained, which spontaneously solidified, M.P. 169–170°.

Example 2

20 g. of 1-methyl-6,7-dimethoxy-3,4-dihydroisoquinoline were dissolved in 40 ml. of pyridine. After addition of 20 ml. of propionic anhydride the mixture was left for 2 hours on a water bath. The mixture was then concentrated in vacuo, dissolved in benzene and again concentrated in vacuo. The latter two operations were repeated, and then the residue was crystallised from ethyl acetate and petroleum ether. After recrystallisation in the same solvents there was obtained 17 g. of 1-methylene-2-propionyl - 6,7 - dimethoxy - 1,2,3,4 - tetrahydroisoquinoline of M.P. 99–100°.

For conversion of the above compound to 2-β-propionylamidoethyl-4,5-dimethoxy-acetophenone the methylene compound was dissolved in 10 times the quantity of 1 N hydrochloric acid and the solution neutralised with potassium carbonate. The yield was quantitative. After recrystallisation from ethyl acetate, the acetophenone derivative melted at 125°. The U.V. spectrum in ethanol showed maxima at 230, 274 and 303 mμ (ε=22,400, 8,320 and 5,100).

Example 3

10 g. of 1-methyl-6,7-dimethoxy-3,4-dihydroisoquinoline and 14 g. of benzoic anhydride were dissolved in 50 ml. of pyridine and warmed on a water bath for 1 hour. The mixture was concentrated and the concentrate dissolved in 10 times the quantity of 1 N hydrochloric acid, while slightly warming, and then neutralized with potassium carbonate. There were obtained 8 g. of 2-β-benzamidoethyl - 4,5 - dimethoxy - acetophenone which was recrystallised from ethanol/water and then melted at 143°. The U.V. spectrum in ethanol showed maxima at 230, 272 and 303 mμ (ε=28,900, 8,800 and 5,100).

Example 4

11 g. of 1,3-dimethyl-6,7-dimethoxy-3,4-dihydroisoquinoline were dissolved in 100 ml. of a mixture of pyridineacetic anhydride (1:1) and left for 1 hour on a water bath. The mixture was concentrated in vacuo, dissolved in benzene and again concentrated in vacuo. The latter two operations were repeated, and the solution evaporated to dryness. The residue crystallised and yielded, after recrystallisation from ethyl acetate-petroleum ether, 8.5 g. of 1-methylene-2-acetyl-3-methyl-6,7-dimethoxy-1,2,3,4-tetrahydroisoquinoline of M.P. 121°. To obtain the acetophenone derivative 7.5 g. of the above methylene compound were dissolved in 50 ml. of 3 N hydrochloric acid while slightly warming. Then, the solution was neutralised with potassium carbonate. After filtering and recrystallisation from ethanol/water, the 2-β-acetamidopropyl-4,5-dimethoxy-acetophenone of M.P. 164° was obtained in quantitative yield. The U.V. spectrum in ethanol showed maxima at 280 and 304 mμ (ε=6,350 and 5,250).

The above product was further converted in the following manner: 7.0 g. of 2-β-acetamidopropyl-4,5-dimethoxy-acetophenone and 4.0 g. of p-chlorobenzaldehyde were completely dissolved in 35 ml. of methanol while warming slightly. 5 ml. of 3 N sodium hydroxide were then added whereupon 2-β-acetamidopropyl-4,5-dimethoxy-ω-(4-chlorobenzylidene)-acetophenone crystallized, M.P. 206° (after recrystallization from methanol).

The above compound was dissolved in 20 ml. of glacial acetic acid, treated with 100 ml. of 20% hydrochloric acid and heated under reflux for one hour. The product was concentrated and then boiled with acetone. 7.5 g. of orange-red crystals of 1-(4-chlorostyryl)-3-methyl-6,7-dimethoxy-3,4-dihydroisoquinoline hydrochloride were obtained, M.P. 127°. 7.0 g. of the hydrochloride were dissolved in 250 ml. of methanol, hydrogenated in the presence of 150 mg. of platinum oxide until 1000 ml. of hydrogen were absorbed. The catalyst was filtered off and the reaction product was concentrated to obtain 5.8 g. of 1 - (4 - chlorophenethyl) - 3 - methyl - 6,7 - dimethoxy-1,2,3,4-tetrahydroisoquinoline hydrochloride, M.P. 260–261°. The hydrochloride was dissolved in hot water and neutralized with sodium hydroxide to obtain the free base. The free base was taken up in chloroform and 3 g. were dissolved in 100 ml. of methanol. 1 ml. of 38% formalin was added. After standing for 30 minutes at room temperature, the reaction mixture was hydrogenated in the presence of 1 g. of Raney nickel catalyst until 330 ml. of hydrogen were adsorbed. The catalyst was separated by filtration, the product was concentrated, dissolved in acetone, then treated with aqueous hydrobromic acid and finally with ether. The product, 1-(4-chlorophenethyl)-2,3 - dimethyl - 6,7 - dimethoxy - 1,2,3,4 - tetrahydroisoquinoline, was crystallized from alcohol-ether, M.P. 191–192°.

Example 5

35 g. of 1,3,6,7-tetramethyl-3,4-dihydroisoquinoline (obtained by reaction of 1-(3,4-xylyl)-2-amino-propane with acetic anhydride and cyclisation of the N-acetyl compound of M.P. 77° formed according to Bischler-Napieralsky to form the 1,3,6,7-tetramethyl-3,4-dihydroisoquinoline [M.P. of the hydrochloride: 244°]) were dissolved in 100 ml. of pyridine. 50 ml. of acetic anhydride were added and the mixture left on a water bath for 2 hours. The reaction mixture was concentrated and the residue dissolved in 3 N hydrochloric acid. The solution obtained was neutralised with potassium carbonate. The 2 - β - acetamidopropyl-4,5-dimethyl-acetophenone crystallized immediately. After recrystallization from ethyl acetate-petroleum ether, there were obtained 32 g. of a product of M.P. 145°. The U.V. spectrum in ethanol showed maxima at 257 and 291 mμ (ε=10,000 and 1,730).

Example 6

The following additional compounds were produced by means of the procedure described in Example 1:

1 - methylene-2-acetyl-6-methoxy - 1,2,3,4-tetrahydroisoquinoline, M.P. 98°;
1-methylene-2-acetyl-6,7-methylenedioxy - 1,2,3,4 - tetrahydroisoquinoline, M.P. 128°;
1 - methylene-2-acetyl - 6,7,8 - trimethoxy-1,2,3,4-tetrahydroisoquinoline, M.P. 85°;
2-β-acetamidoethyl-4-methoxy-acetophenone, M.P. 87°;
2-β-acetamidoethyl-4,5 - methylenedioxy - acetophenone, M.P. 122°;

2 - β - acetamidoethyl - 4,5,6 - trimethoxy-acetophenone, M.P. 58°.

We claim:
1. A compound represented by the formula

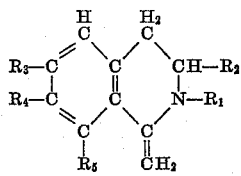

wherein $R_1$ represents the acyl radical of a member of the group consisting of lower alkanoic acids and monocyclic carbocylic carboxylic acids, $R_2$ represents a member of the group consisting of hydrogen and lower alkyl and $R_3$, $R_4$ and $R_5$ represents a member of the group consisting of hydrogen, lower alkyl, lower alkoxy and lower alkylenedioxy when two adjacent symbols R are joined together.

2. 1-methylene-2-lower alkanoyl-6,7-dilower alkoxy-1,2,3,4-tetrahydroisoquinoline.

3. 1-methylene-2-acetyl-6,7-dilower alkoxy-1,2,3,4 - tetrahydroisoquinoline.

4. 1-methylene-2-acetyl-6,7-dimethoxy - 1,2,3,4 - tetrahydroisoquinoline.

5. A compound represented by the formula

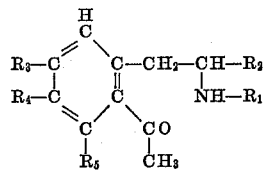

wherein $R_1$ represents the acyl radical of a member of the group consisting of lower alkanoic acids and monocyclic carbocylic carboxylic acids, $R_2$ represents a member of the group consisting of hydrogen and lower alkyl and $R_3$, $R_4$ and $R_5$ represent a member of the group consisting of hydrogen, lower alkyl, lower alkoxy and lower alkylenedioxy when two adjacent symbols R are joined together.

6. 2-β-lower alkanoylamido-lower alkyl-4,5-dilower-alkoxy-acetophenone.

7. 2-β-acetamidoethyl-4,5-dilower - alkoxy - acetophenone.

8. 2-β-acetamidoethyl-4,5-dimethoxy-acetophenone.

9. A process for the production of a 2-β-acylamido-lower alkyl-acetophenone which comprises reacting with up to about 6 normal dilute mineral acid a compound represented by the formula

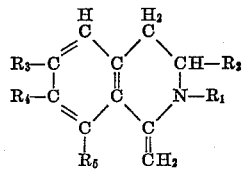

wherein $R_1$ represents the acyl radical of a member of the group consisting of lower alkanoic acids and monocyclic carbocylic carboxylic acids, $R_2$ represents a member of the group consisting of hydrogen and lower alkyl and $R_3$, $R_4$ and $R_5$ represent a member of the group consisting of hydrogen, lower alkyl, lower alkoxy and lower alkylenedioxy when two adjacent symbols R are joined together.

10. A process for the production of 2-β-lower alkanoylamido-lower alkyl-4,5-dilower - alkoxyacetophenone which comprises reacting 1-methylene-2-lower alkanoyl-6,7-dilower alkoxy-1,2,3,4 - tetrahydroisoquinoline with up to about 6 normal dilute mineral acid.

11. A process for the production of 2-β-acetamidoethyl-4,5-dimethoxyacetophenone which comprises reacting 1-methylene-2-acetyl-6,7-dimethoxy-1,2,3,4 - tetrahydroisoquinoline with up to about 6 normal dilute mineral acid.

12. A process as in claim 11 wherein the mineral acid is hydrochloric acid.

References Cited in the file of this patent
FOREIGN PATENTS
11,108    Great Britain _____ Dec. 31, 1909
OTHER REFERENCES
Dey et al.: Indian Chem. Soc. 13, page 281 (1936).